United States Patent [19]

Chatterjea

[11] 4,311,068

[45] Jan. 19, 1982

[54] MODULATED TRANSMISSION WITH CONVERTER AND MODULATOR-LOAD-PISTON WHICH FULLY RESETS AND DUMPS CONVERTER

[75] Inventor: Probir K. Chatterjea, Mount Prospect, Ill.

[73] Assignee: International Harvester Company, Chicago, Ill.

[21] Appl. No.: 37,596

[22] Filed: May 10, 1979

[51] Int. Cl.³ .................. F16H 47/06; F16D 33/06
[52] U.S. Cl. ..................... 74/733; 74/655; 74/730; 74/731; 192/3.22; 192/4 A; 192/4 C
[58] Field of Search ............ 74/733, 655, 730, 731, 74/DIG. 1; 192/109 F, 3.22; 60/351, 357

[56] References Cited

U.S. PATENT DOCUMENTS

| 2,929,267 | 3/1960 | Wilson | 74/731 X |
|---|---|---|---|
| 2,935,999 | 5/1960 | Hock et al. | 192/109 F X |
| 3,033,333 | 5/1962 | Breting et al. | 192/4 A |
| 3,125,201 | 3/1964 | Fisher | 192/4 A |
| 3,181,385 | 5/1965 | Siler | 74/364 |
| 3,336,815 | 8/1967 | Leonard | 74/DIG. 1 |
| 3,444,968 | 5/1969 | Golan et al. | 192/4 A |
| 3,524,523 | 8/1970 | Klimex et al. | 74/DIG. 1 |
| 3,533,235 | 10/1970 | Oguma et al. | 60/357 |
| 3,882,738 | 5/1975 | Audiffred, Jr. et al. | 192/87.19 X |
| 3,965,680 | 6/1976 | Cottrell | 60/357 |
| 3,991,865 | 11/1976 | Komatsu | 137/116.3 X |
| 3,998,111 | 12/1976 | Blake | 192/4 A |
| 4,000,795 | 1/1977 | Patton | 192/109 F |
| 4,023,444 | 5/1977 | Murakami | 192/109 F X |
| 4,046,160 | 9/1977 | Horsch | 192/109 F X |
| 4,132,302 | 1/1979 | Chatterjea | 192/109 F X |
| 4,135,610 | 1/1979 | Chatterjea | 192/109 F X |
| 4,216,851 | 8/1980 | Chatterjea | 192/4 A |

Primary Examiner—Leslie Braun
Attorney, Agent, or Firm—John W. Gaines; Ronald C. Kamp; F. David AuBuchon

[57] ABSTRACT

A multi functioning hydraulic transmission control circuit including interacting valve mechanism parts which, in response to a shift being called for in a clutch-cylinder-controlled multi-speed transmission, inaugurate a fill pressure flow to the clutch cylinders concerned, prior to the subsequent fluid pressure rise effected therein; thereafter, upon completion of the fill, the parts modulate pressure rise of the hydraulic clutch fluid from and at approximately actual clutch fill pressure up to, and remaining at, the final pressure of engagement.

These functions including full resetting of the parts at the beginning of each shift, and a lesser and a least gradual pressure rise afforded during shifts into respective second and third speed drive ratios, are all accomplished by and among a pair of direction-selector and orificed-speed-selector valve spools connected to the transmission clutch cylinders to direct valve fluid output thereto selectively, and also 1st, dump valve, 2nd, simulated clutch piston, 3rd, load piston, 4th, modulator valve, and 5th, interacting spring parts collectively providing said directed valve fluid output, all in a valve bore common thereto, and arranged therein with the dump valve part confronted at one side by the simulated clutch piston part so as to define mutually therewith a differential pressure chamber in the bore, and confronted at the other side by a first side of the load piston part so as to define mutually with that first side a signal pressure chamber in the bore, and with an opposite side of the load piston part spacedly confronting the modulator valve part so that they mutually engage therebetween the interacting spring parts in the common bore.

17 Claims, 10 Drawing Figures

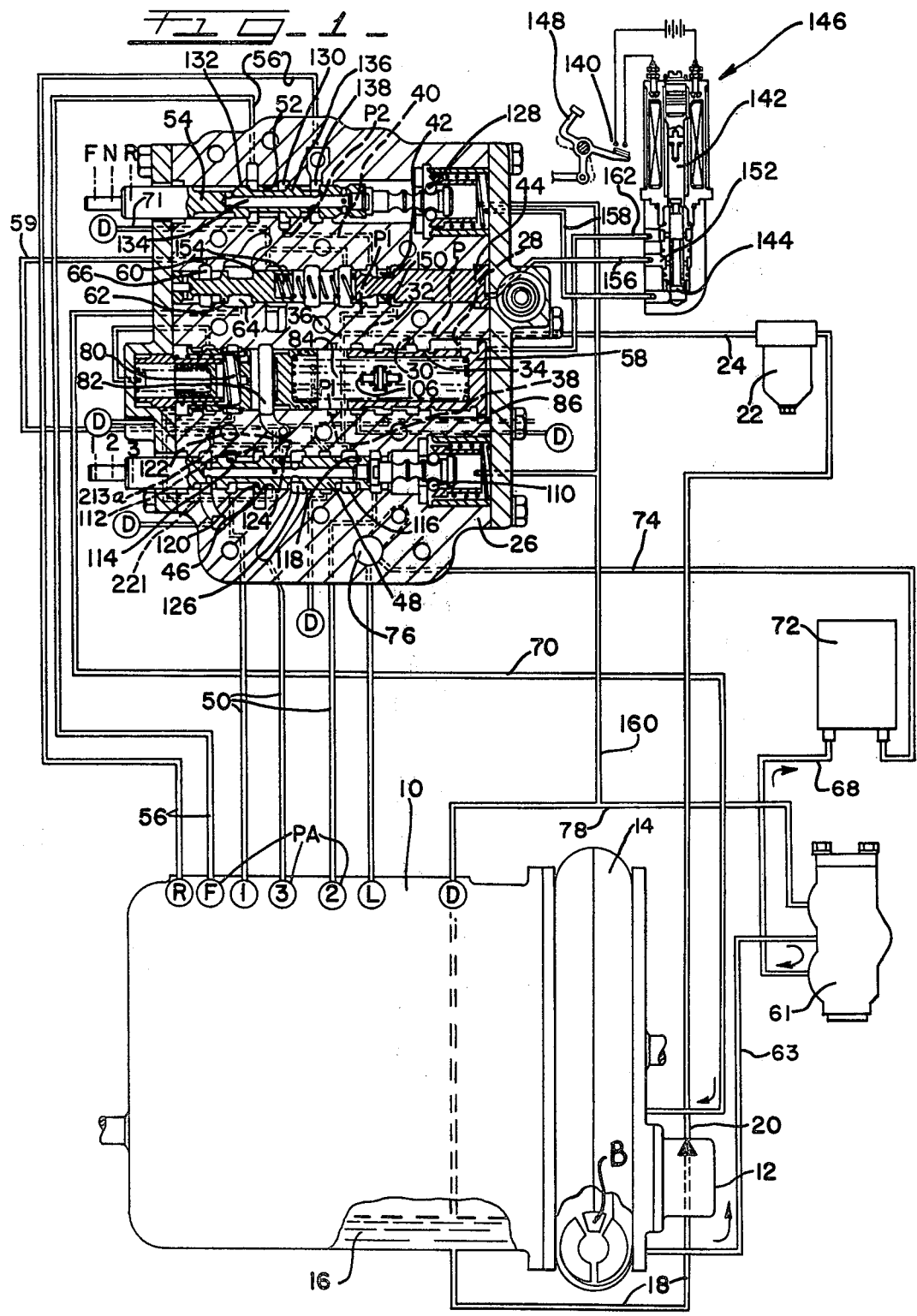

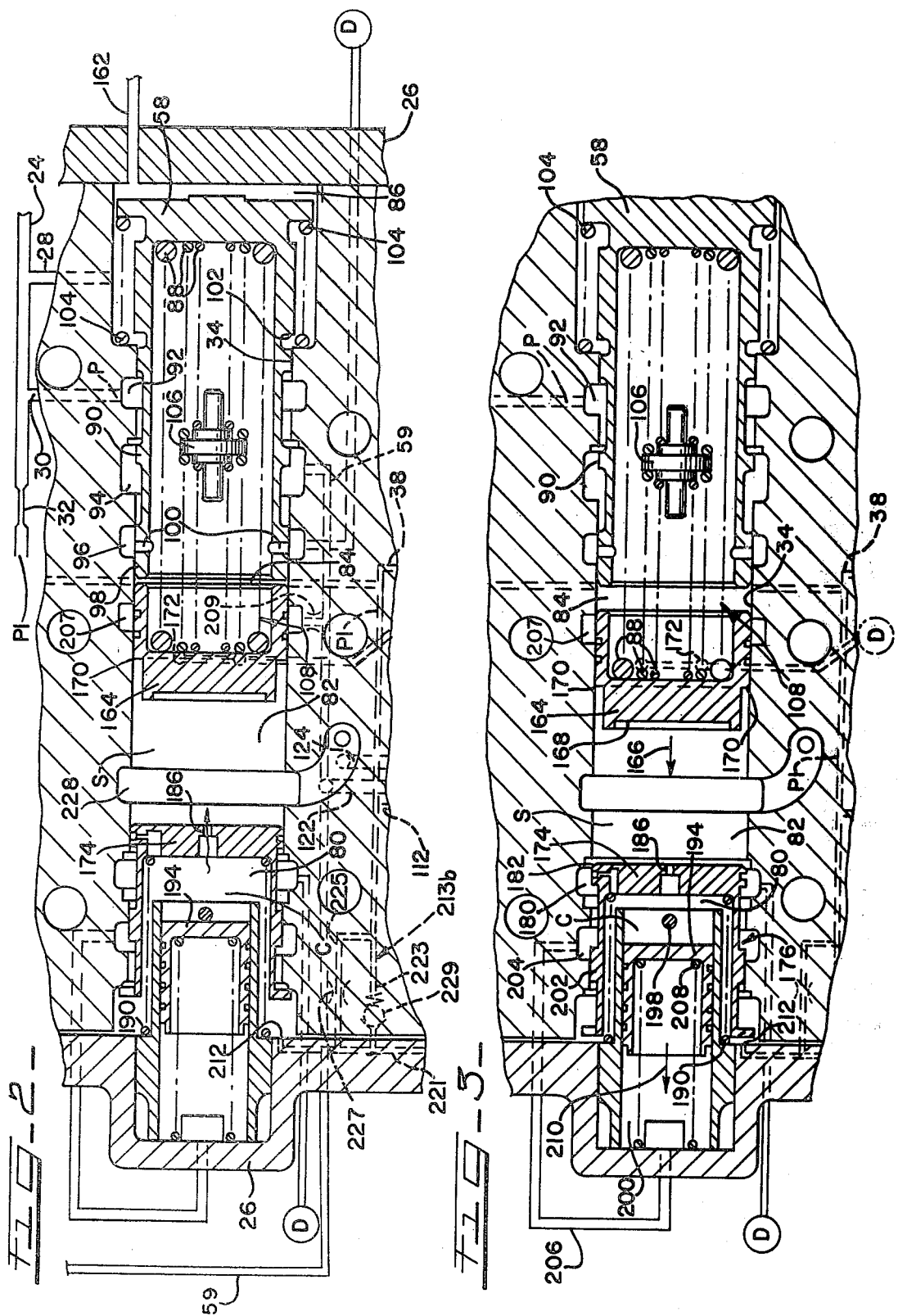

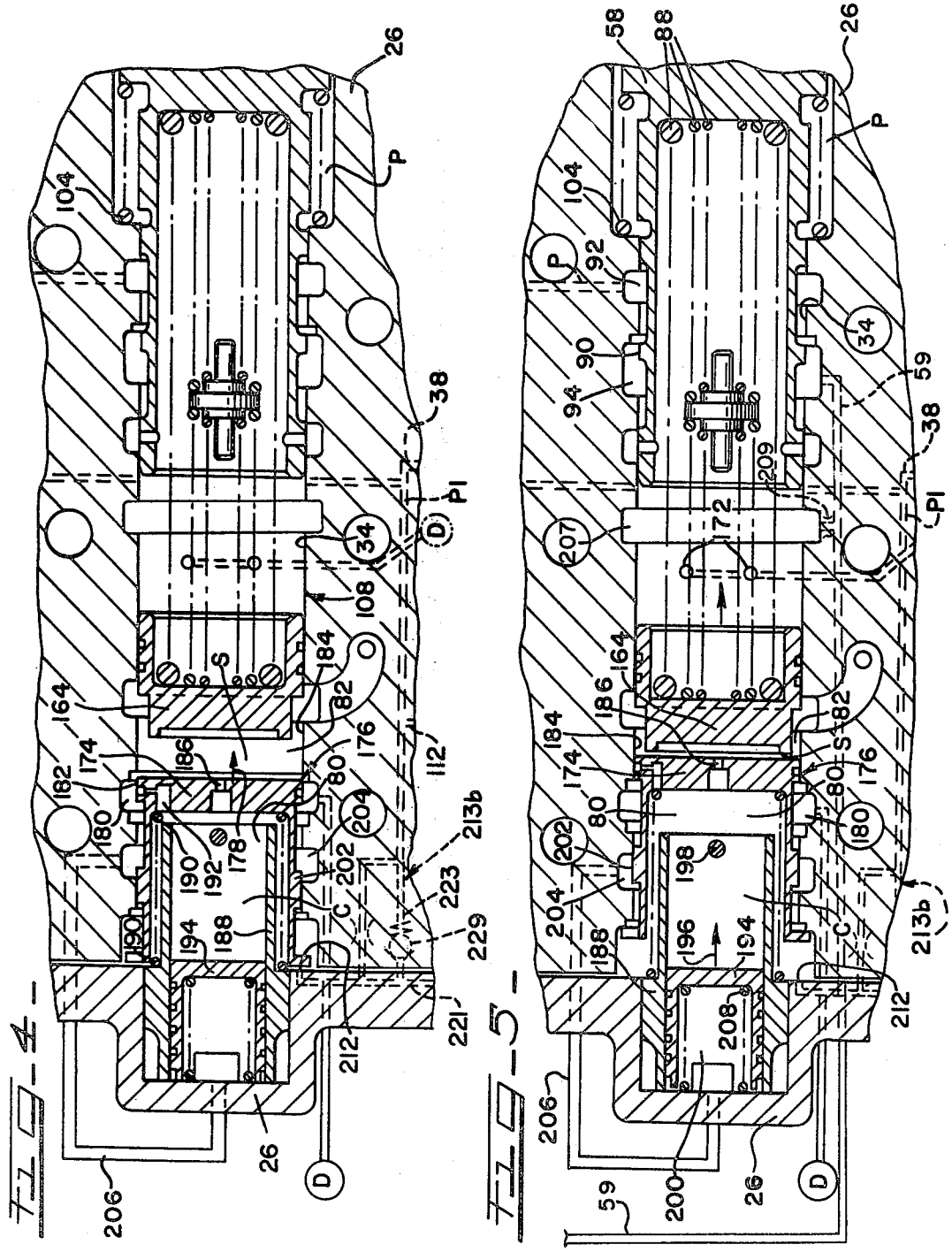

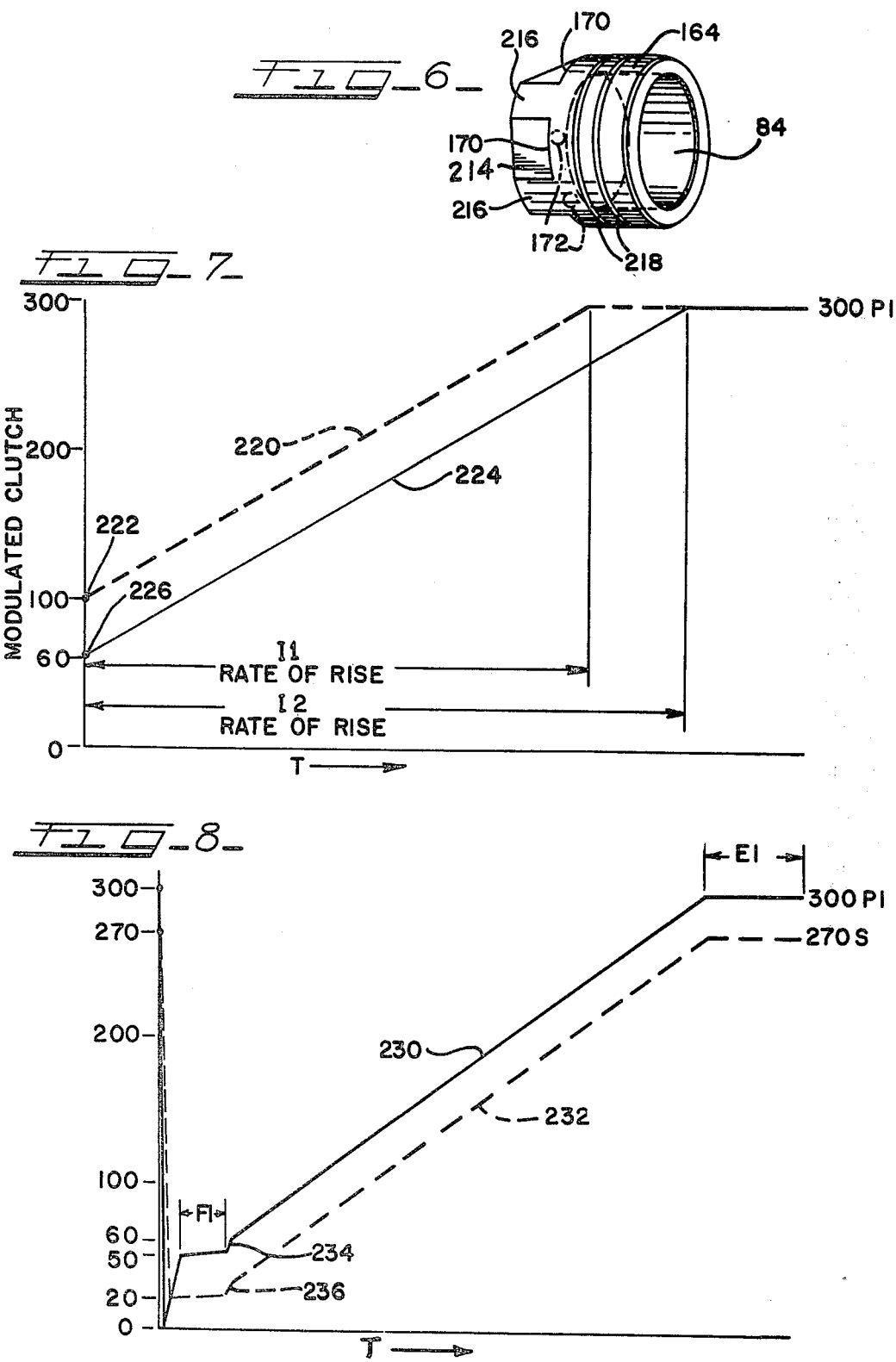

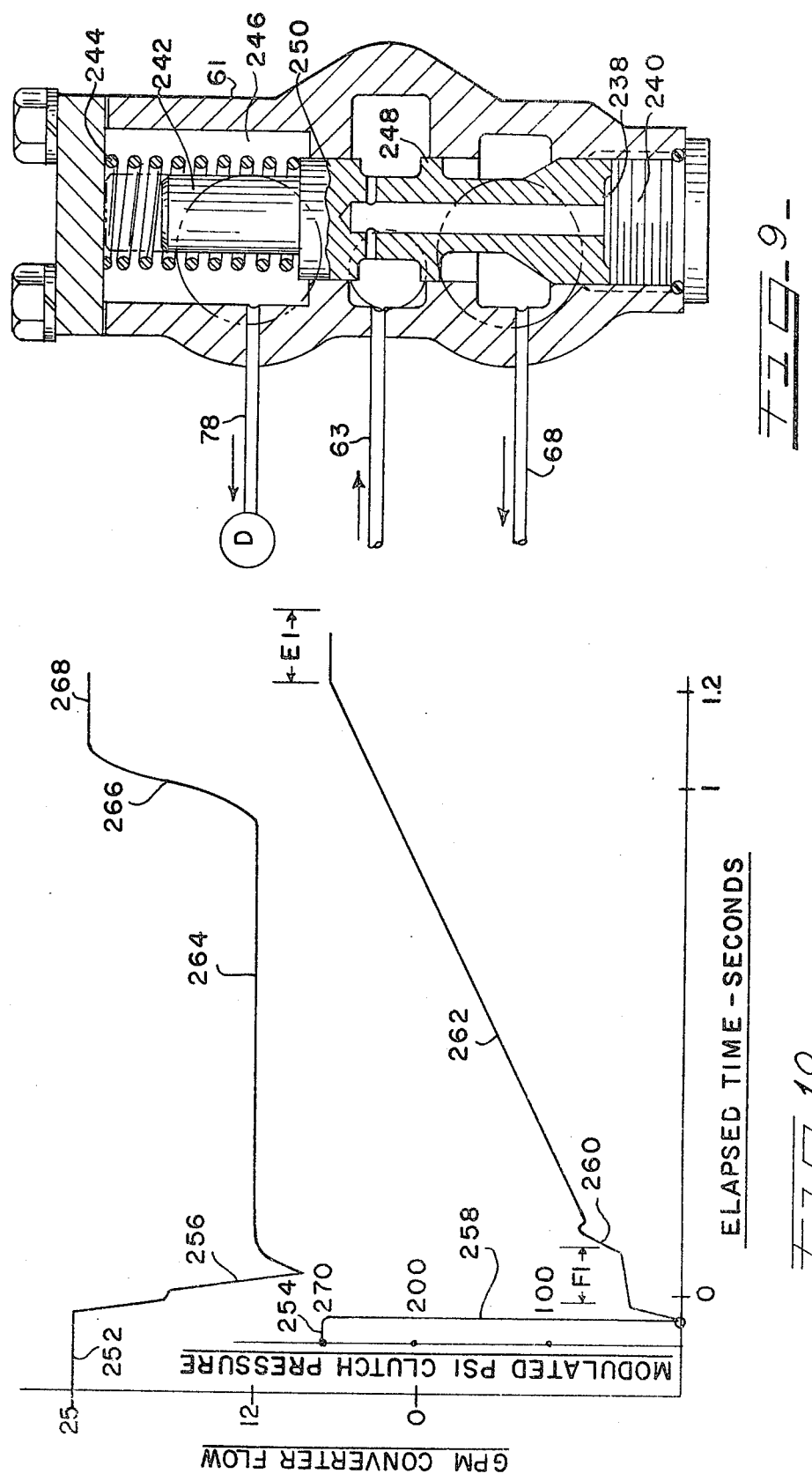

MODULATED TRANSMISSION WITH CONVERTER AND MODULATOR-LOAD-PISTON WHICH FULLY RESETS AND DUMPS CONVERTER

This application is a companion case of U.S. Ser. No. 693,469, filed June 7, 1976, Ser. No. 737,966 filed Nov. 2, 1976, and Ser. No. 890,002 filed Mar. 24, 1978, all owned by the present assignee. More particularly, this application is a continuation in part of parent application Ser. No. 890,002 filed Mar. 24, 1978, now U.S. Pat. No. 4,216,851 which is a division of application Ser. No. 693,469 filed June 7, 1976, now U.S. Pat. No. 4,135,610.

The present invention relates to hydraulic controls for smoothly effecting shifting of a vehicular converter-type transmission in which the shifting power is provided by hydraulic pressure applied not only in the transmission itself but also in the converter, i.e., to effect a smooth power-shift.

It more specifically relates to a multi-functioning hydraulic transmission control circuit including interacting valve mechanism parts which, in response to a shift being called for in a clutch-cylinder-controlled multi-speed transmission, inaugurate a fill pressure flow to the clutch cylinders concerned, prior to the subsequent fluid pressure rise effected herein; thereafter, upon completion of the fill, the parts modulate pressure rise of the hydraulic clutch fluid from and at approximately actual clutch fill pressure up to, and remaining at, the final pressure of engagement.

The above parts, which shift position either directly or indirectly in response to position changes made to a transmission shift lever by an operator, comprise 1st speed selector and 2d director selector valve spools connected to the transmission clutch cylinders to direct valve fluid output thereto selectively, and also 3d dump valve, 4th a load piston, 5th another piston, 6th a modulator valve, and 7th interacting spring parts collectively providing said directed valve fluid output, all in a bore common thereto, and arranged therein with the dump valve part confronted at one side by the other piston part, 5th above, so as to define mutually therewith a differential pressure chamber in the bore, and confronted at the other side by a first side of the load piston so as to define mutually with that first side a signal pressure chamber in the bore, and with an opposite side of the load piston part spacedly confronting the modulator valve part so that they mutually engage therebetween the interacting spring parts, 7th above, in the common bore.

Background patents with prior disclosures of interest on the subject include, but are not limited to, U.S. Pat. Nos. 3,033,333, 3,125,201, 3,181,385, 3,352,392, 3,444,968, 3,498,150, 2,935,999, 3,583,422, 3,618,424, 3,882,738, 3,991,865, 3,998,111, 4,000,795, and 4,046,162. Such patents are relevant as prior teachings of shock free clutch engagement in transmissions with and without converters, but fail to show the present sequence of withholding and applying hydraulic pressure to a power shift transmission itself and to a converter so that each cooperates in that order to effect a smooth power-shift.

According to past transmission practices in tractors and other vehicles in connection with controlled rate of rise valve assemblies each including a modulator valve and an associated load piston therefor, the speed and direction clutches provided in the transmission have been operated through the controlled rate of rise valve assembly to cushion clutch engagement. In tractor transmissions affording multi-speed ranges both forward and reverse, it is neither necessary nor desirable that the pressure rise be as gradual in other transmission speed settings aside from the high torque, first speed which tends to engage jerkily. In other words as soon as it is upshifted out of first, a transmission works at a disadvantage without having a lesser and a least gradual pressure rise afforded during its respective second and third speed upshifts. The same applies to shifts made initially into second or third speed. And all the more it is a disadvantage that the rate of rise valve assembly is hydraulically spaced a long distance away from the transmission controlled thereby so that the valve assembly in a sense operates too remotely from, and altogether ignorantly of, the actual clutch fill pressure existing in the transmission itself. The latter disadvantage manifests itself in the functioning of the modulator valve and load piston in some cases, with the load piston never fully resetting itself, whereupon the subsequent fluid pressure rise starts at a point appreciably higher than actual clutch fill pressure in the transmission itself and so no smooth, gradual shift results.

According to my invention, the foregoing disadvantages and drawbacks are materially reduced in severity if not eliminated altogether, because the functions including full resetting of the parts at the beginning of each shift, and a lesser and a least gradual pressure rise afforded during both direct shifts into, and upshifts to, respective second and third speeds, are all accomplished by and among the novelly coacting parts hereinabove enumerated. One preferred way for such accomplishment resides in the present provision of a simulated clutch piston serving in the rate of rise valve assembly as the other piston, 5th above, and in the present provision of an orificed valve passage in the bore housing progressively opened between the speed selector valve spool, 1st above, and the signal pressure chamber in the aforesaid common bore. Also figuring in such accomplishment is provision herein made for the load piston, as it resets, to transiently leak-off or "dump" pressure in the converter and introduce an appreciable excess converter slip and thereafter, as the piston moves in inaugurating and completing a relatively soft transmission shift, the load piston then stops the converter from dumping and thus eliminates the transient, intra shift, excessive slip in the converter, all as will now be explained in detail.

Features, objects, and advantages will either be specifically pointed out or become apparent when, for a better understanding of the invention, reference is made to the following description taken in conjunction with the accompanying drawings which show a preferred embodiment thereof and in which:

FIG. 1 is a schematic showing of a converter-equipped, three-speed forward, three-speed reverse, powershift transmission and hydraulic power control system therefor, with the load-piston-modulated rate of rise valve assembly of the present invention forming part of the control system shown;

FIGS. 2, 3, 4, and 5 are all enlarged cross sectional views of the rate of rise valve assembly of the invention, the same as appears as a small detail in FIG. 1 and with the components shown in FIGs. 2-5 in various operating positions;

FIG. 6 is an isometric view to enlarged scale of an hydraulic modulator load piston appearing in longitudinal cross section in each of the foregoing figures;

FIG. 7 is a graphical representation of a portion of clutch pressure traces desirably and undesirably associated with the operation of the control system foregoing;

FIG. 8 is a graphical representation of complete clutch pressure traces associated with the operation;

FIG. 9 is an enlarged cross sectional view of the converter back pressure regulator, the same as appears as a small detail in FIG. 1; and FIG. 10 is a composite graphical representation of a complete converter flow trace and complete clutch pressure trace, respectively.

More particularly in the drawings, a reversible, power shift transmission 10 controlled in accordance with my invention is shown in FIG. 1 having a torque converter 14 and having three speeds in forward range of the transmission and three speeds in the reverse range. The transmission 10 has hydraulically operated clutch units controlled first by a piston and cylinder 1, and similarly by 2, 3, F, and R for power shift operation. In one of the standard ways, the clutch units controlling 1, 2, and 3 speeds are in the forward section of gearing, whereas the units controlling directions F-R are in the output section of the transmission 10. The transmission selected for illustration is primarily a heavy duty one, for use in tractors and other vehicles.

Located forwardly of the transmission 10 are an engine driven hydraulic pump 12 and the referred to engine driven torque converter 14 coupled to the transmission 10 to provide torque-amplified input thereto. The stator or reaction member has its fixed blading indicated at B which provides the amplification between its companion impeller and turbine members illustrated in converter 14.

Hydraulic drainage from various drains denoted D is collected in a transmission sump 16, from which it is drawn through a pump intake line 18 into the inlet side of the hydraulic pump 12. From its pump output side, the pump 12 discharges hydraulic fluid through an outlet line 20 and a filter 22, thence into a pump pressure line 24 at pressure p.

Pump line pressure P enters a rate of rise valve assembly housing 26 through a modulating pressure chamber conduit 28, through a modulated bore core conduit 30, and through a rate of rise valve modulation bore restriction which is a large, fixed clutch-fill orifice 32 forming a separate part of a rate of rise valve assembly modulation bore 34 and feeding valve output pressure P1 into a housing tee 36.

The tee 36 on the downstream side of the modulation bore restriction 32 splits into lower and upper branches as viewed in FIG. 1. Hydraulic fluid under a valve modulated first output pressure P1 flows through the lower branch into a speed valve output connection 38. In the upper branch, hydraulic fluid originally under pressure P1 is supplied to a direction valve output connection 40 at a valve modulated second output pressure P2 by way of a neutralizer valve bore 42 occupied at one end by a neutralizer valve spool 44.

In the valve housing 26, in a speed valve bore 46 interposed in the speed valve output connection 38, a three-position speed valve spool 48 is reciprocally positioned by the operator to selectively supply valve modulated first output fluid to a set of individual speed lines 50 leading to each one of the pistons and cylinders 1, 2, 3, of the speed of drive clutch units in the forward section of the transmission 10. Each line 50 is a long one and, due to friction and restriction therein, the actual clutch pressure PA of the clutch units will be substantially less than the valve modulated first output pressure P1.

Similarly, in a direction valve bore 52 interposed in the direction valve output connection 40, a three-position range or direction valve spool 54 is reciprocally positioned by the operator to selectively supply valve modulated second output fluid at pressure P2 to a pair of individual direction lines 56 leading to pistons and cylinders F, R of the clutch units in the output section of the transmission 10. The transmission is thus reversible, with three speeds 1, 2, 3 in the F or forward direction of drive range, and with three speeds likewise in its R or reverse range of operation. Due to hydraulic friction and restriction in each of the direction lines 56 which afford a long and somewhat tortuous path to flow of hydraulic fluid therein, actual pressure PA in the piston and cylinder F and in the piston and cylinder R will be substantially less than the pressure P2 in the direction valve output.

TORQUE CONVERTER—FIG. 1

In operation of the hydraulic system for smooth shifts and smooth torque amplification, hydraulic fluid keeps the converter 14 filled, the inlet pressure being of the order of 45 psi (3.1 atmospheres) and the back pressure being roughly 37 psi±2 psi (approximately 2.5 atmospheres) to the extent maintainable, with use of a Rockford Clutch Company high performance Model 6-F-1307-3 reverse cooled converter, for example; a not uncommon operational characteristic of the latter is an upwardly steep torque curve dependent upon increasing back pressure and, conversely, a rather abrupt drop off in torque transmission with reducing back pressure. This particular converter has three elements in the torus flow sections, has single stage, single phase operation, and has the stator element thereof located in the radially innermost flow section with the other two elements occupying substantially all the remaining spaces. Stall torque, in one physically constructed embodiment of a suitable converter, ran consistently high at 2.88±0.01 to 1.

The supply of fluid to the torque converter inlet is provided by a rate-of-rise-pressure modulating valve 58 located in the right end of the rate-of-rise valve assembly modulation bore 34, by an interconnecting line 59, and by an input pressure regulator valve spool 60 reciprocal in the left end of the neutralizer valve bore 42. The back pressure on the converter outlet is maintained by a back pressure regulator or valve 61 in the outlet line 63.

More particularly as the path to the converter inlet continues past the interconnecting line 59, a land 62 on the input regulator valve spool 60 is operatively located between a second core groove 64 connected to a converter inlet line 70 and a first core groove 66 connected to the line 59. As the pressure of hydraulic fluid supplied by the modulating valve 58 rises between the end of the spool 60 and the left end of the bore 42 against which it is seated, the spool 60 moves rightwardly as viewed in FIG. 1 in response to this activating pressure; the intervening land 62 thereon adjustably opens and intercommunicates the first bore groove 66 and second bore groove 64, which latter under regulated pressure then pressurizes the line 70 supplying the converter inlet. When the converter inlet pressure tends to rise above the regulated input level, the spool 60 at its right end moves that end farther rightwardly as viewed in FIG. 1 and the spool right end dumps the excess input fluid to drain D through a drain outlet line 71.

The efficient converter 14, which reverts to high slippage immediately it loses a relatively high level of back pressure maintained thereon, has its discharge served by a path of flow including its outlet line 63, the regulator valve 61, a cooler inlet connection 68, an oil cooler 72 for the converter, a cooler outlet line 74, and a housing oil gallery 76, thence to the pump intake of a transmission lube system L and ultimately into the transmission sump 16. When the converter back pressure tends to rise above the regulated level, the valve 61 re-establishes that level by dumping the excess discharge fluid to drain D through a drain outlet line 78.

PRESSURE MODULATING VALVE 58–FIG. 2

As indicated, it is the rate-of-rise-pressure modulating valve 58 as shown in this figure which supplies converter inlet fluid. More particularly in the rate of rise valve assembly modulation bore 34, which bore is divided into the respective differential pressure chamber 80, signal pressure chamber 82, spring chamber 84, and modulating pressure chamber 86 as viewed in that order from left to right in FIGS. 1 and 2, the modulating valve 58 is of piston shape and is oriented with its piston end hydraulically separating the spring chamber and modulating pressure chamber 84 and 86 in the bore 34.

During the normal regulation with transmission operating in the drive condition into which it has been shifted, the valve 58 takes the regular intermediate open position as shown in solid lines in FIGS. 1 and 2, having been moved by hydraulic pressure in the modulating pressure chamber 86 to a point where that hydraulic pressure is exactly equal to and balanced by a partially compressed, shift spring group 88 pressing against the inside of the valve piston end. In that intermediate position shown, a regulating valve land 90 maintains the pump pressure P in a bore core 92 by controlling flow of excess fluid into a bore core 94 thence to the torque converter (not shown in FIG. 2) through a path including the interconnecting line 59. Additional pressure encountered in the modulating pressure chamber 86, as due to stiff, very cold oil, will bring about progressive leftward opening movement of the valve 58 causing cooperation between a bore core 96 connected to drain D and a dual function dump land 98 on the valve 58. The dump land 98 has a valve edge at the right as viewed in FIG. 2 which uncovers core 96 and provides a first function whereby oil from the cores 92 and 94 will go directly to the bore core 96 and drain D, at least until the oil warms up in the system. The dump land 98 also has ports 100 performing the second function, in all positions of the valve 58, of continuously venting the spring chamber 84 to drain D by way of the core 96. A shoulder 102, formed on the valve 58 adjacent a valve seating spring 104, engages the fixed seat for spring 104 and limits progressive valve opening movement to a relatively short amount of overall valve travel.

An intermediate guide and seat 106 aligns inner ones of the springs of the spring group 88 which are connected thereby to act in tandem within the spring chamber 84.

The shift spring group 88 and associated parts within the rate of rise valve assembly modulation bore 34 form a rate of rise valve assembly generally indicated at 108 and described in detail shortly.

SPEED VALVE—FIG. 1

When the spool 48 in the speed valve bore 46 is detented at 110 in the first or 1 speed position as shown in solid lines, the speed lines 50 to the respective piston and cylinder units 2 and 3 are connected by the spool 48 in readily discernible paths to drain D; at the same time from the output connection 38 in which the speed valve is located, the valve modulated first output pressure P1 through a short conduit 112 is admitted by an open spool land 114 into an individual speed line 50 and the clutch piston and cylinder 1 so as to prepare the transmission 10 for first speed drive.

Progressive inward movement of the speed valve spool 48 rightwardly so as to assume an intermediate or 2 position, causes the piston and cylinder 1 and 3 to be connected by the spool 48 to drain D; at the same time valve modulated first output pressure P1 from the output connection 38 and a core groove 116 is admitted by an open spool land 118 into the appropriate speed line 50 thence into piston and cylinder 2 to prepare the transmission 10 for second speed drive. Also at the same time, a second branch source of the fluid system output is opened under pressure P1 to supply fluid therefrom to the signal pressure chamber 82; more specifically, spool land 120 uncovers the mouth of a first auxiliary passage 122 interconnecting the short output conduit 112 and the signal pressure chamber 82 so as to provide a first supplement to the flow of fluid in the latter for a reason later to be disclosed. That same spool land 120 upon further depression of the spool 48 to extreme rightward position corresponding to speed 3, uncovers the mouth of a second auxiliary passage 124 between the short output conduit 12 and the signal pressure chamber 82 to afford a second supplement to the flow of hydraulic fluid into the latter.

When the spool 48 is fully depressed rightwardly at the time for the speed 3 condition, the clutch piston and cylinder units 1 and 2 are connected to drain D; at that time, the spool land 120 uncovers and leaves open a core groove 126 to pressure P1 in the short output conduit 112, so as to pressurize the clutch piston and cylinder 3 and prepare the transmission 10 for speed 3 condition.

DIRECTION VALVE—FIG. 1

When the spool 54 in direction valve bore 52 is detented at 128 registering at position F for forward drive as shown by solid lines, the valve modulated second output pressure P2 which enters first a core groove 130 and thereafter a direction valve bore 52, is directed by a spool land 132 into the appropriate individual direction line 56 and introduced by the latter into the piston and cylinder F to complete forward drive in the transmission. The individual line 56 to the one clutch piston and cylinder R is meantime connected by the spool 54 in a path leading through the hollow core 134 of the latter, past the detent 128, and thence to drain D in the transmission 10 whereby the one clutch cylinder is kept inactive.

When the direction valve spool 54 is partway depressed into an intermediate position corresponding to N to neutralize the transmission 10, the pressurized core groove 130 of direction valve bore 52 is blocked off by the spool land 132 and by an adjacent land 136, whereas both direction lines 56 are connected to drain D in discernible direction valve paths in FIG. 1. So the direction clutches are disengaged and no drive is transmitted through the transmission 10.

Finally upon full depression of the spool 54 into its extreme position corresponding to the R condition of the transmission for reverse, the spool land 136 directs pressure P2 from the core groove 130 into a core groove 138, whence the pressure P2 is communicated through the appropriate direction line 56 into the clutch piston and cylinder R, completing the reverse path through the transmission 10. At the same time, the direction line 56 to the clutch piston and cylinder F for forward drive is connected by the spool 54 in a path including the hollow core 134, past the detent 124, thence to drain D so as to keep the transmission forward drive inactive.

NEUTRALIZER—FIG. 1

The neutralizer valve spool 44, which in a rightward position has a condition of repose as shown, and which has a controlled, shifted position which would be leftwardwise as viewed in FIG. 1, is under the electrohydraulic control of a brake operated, transmission neutralizer contacts component 140, an electric neutralizer valve solenoid 142, and an hydraulic neutralizer valve component 144, all forming parts of a three-way cartridge solenoid valve assembly generally indicated at 146. The valve assembly 146 is in turn controlled by the vehicle brake pedal 148 in a way automatically to neutralize the transmission 10 at all times during which the vehicle brakes are applied.

During normal vehicle running conditions, the neutralizer valve spool 44 occupies its rightward or repose position, and so do the brake pedal 148 and valve assembly 146, all as shown in solid lines in FIG. 1. During such condition of repose, a spool groove 150 on valve spool 44, a spool groove 152 on valve component 144, and an interaction spring 154 between the torque converter input pressure regulator valve spool 60 and the neutralizer valve spool 44 urging them toward opposite ends of the bore 42, are performing as follows. The spool groove 150 completes an hydraulic path between the housing tee 36 and direction output connection 40; therefore, the valve modulated first and second output pressures P1 and P2 are equal to one another, enabling the selected ones of the speed and direction clutches to remain operative so that the transmission 10 stays engaged. The spool groove 152 completes an hydraulic path leading from the end of the bore 42 occupied by the corresponding end of the neutralizer valve spool 44, through a neutralizer valve line 156, thence into the groove 152, and a pair of series connected drain lines 158 and 160 leading to drain D in transmission 10. So the unopposed spring 154 maintains the input regulator spool 60 in proper position for accurately regulating the converter inlet pressure and at the same time performs its other function of holding the neutralizer spool 44 in is unshifted position of repose as shown in solid lines in FIG. 1, allowing the transmission 10 to continue to drive in the direction and speed settings selected.

However, depression of the brake pedal 148 into the broken line position shown, not only applies the vehicle brakes by conventional means, not shown, but also moves a switch arm counterclockwise as viewed in FIG. 1 closing the transmission neutralizer contacts component 140 and setting the transmission 10 in neutral. More particularly, contact closing in the battery solenoid illustrated electromagnetically causes the valve solenoid component 142 to rise as viewed in FIG. 1 and to shift upwardly the spool groove 152 therewith. Therefore, the modulating pressure chamber 86 at pressure P is interconnected by way of a pressure line 162 with the spool groove 152, and at the same time the neutralizer valve line 156 is connected with the same spool groove 152, thus pressurizing that end of the valve bore 42 which is occupied by the corresponding end of the neutralizer spool 44.

Accordingly, against the resistance of the compression spring 154, the neutralizer spool 44 is pressure actuated under pressure P into its shifted position, to the left as viewed in FIG. 1; the neutralizer spool groove 150 interconnects the direction valve output connection 40 and drain D, whereas pressure P1 from the housing tee 36 is blocked off by the main portion of the neutralizer spool 44. Hence, the F-R direction clutch units are disengaged, interrupting the transmission of power in transmission 10 always contemporaneously with brake application. So the vehicle brakes engage to stop motion or to arrest motion of the vehicle to the degree desired, without having to overcome traction power of the engine as well. Reaction at spool 60 to the foreshortening compression spring 154 against it naturally increases converter inlet pressure somewhat during braking, but there are no perceptible results because the transmission perforce is in neutral at the time.

RATE OF RISE VALVE ASSEMBLY—FIG. 3

Forming part of the rate of rise valve assembly 108, a load piston 164 is controlled by hydraulic pressure of signal pressure chamber 82 and by mechanical pressure of the spring group 88 either to perform a resetting stroke in the bore 34 in the direction of an arrow 166, and to perform a loading, opposite reciprocal stroke to the right as viewed in FIG. 3. The piston 164 has a crown head which is formed with a shallow central recess 168 and which is subject to signal pressure S, and has the spring group 88 seated inside the head so as to interact with the modulating valve 58 by reacting thereagainst and loading it for the desired rate of rise modulation.

About the load piston 164, a uniplanar ring includes four spaced apart control edges 170 on the piston that establish cooperation with two drain connected bore ports 172, which ports are in the path of reciprocation of the piston 164 and which are uncovered by the control edges 170 during piston movement to the right as viewed in FIG. 3.

Thus, travel of the load piston 164 during its loading stroke is limited by the piston 164 venting the signal pressure S to drain immediately the ports 172 are uncovered. Conversely, piston travel for resetting in the direction of the arrow 166 is limited as the piston 164 stops immediately upon contact with, or in practice just short of, the transmission dump valve 174 of an adjacent signal pressure control assembly 176.

TRANSMISSION DUMP VALVE—FIG. 4

As viewed in its transient position adjacent signal pressure chamber 82 in FIG. 4, the dump valve 174 will be appreciated to have primary control over the emptying and filling of chamber 82. That is, leftward movement of the dump valve 174 opposite to the direction of an arrow 178 will vent the signal pressure chamber 82 through a bore core 180 to drain, tending to empty the chamber. But movement of the dump valve 174 in the direction of the arrow 178 causes a sealing edge 182 thereof to seal off an adjacent land 184 in the bore 34 and allow a constant differential constant flow, timing orifice 186 fixed in the center of the dump valve 174 to fill the signal pressure chamber 82. The dump valve cavity pressure C within the differential pressure chamber 80 causes essentially one way flow through the fixed timing orifice 186.

Within the dump valve cavity, a sleeve 188 is fixed and provides the seat for a light spring 190 urging the dump valve 174 to its sealed closed position in the direction of the arrow 178. The head of the valve 174 incorporates a pressure equalizing groove formation 192 to keep the valve centered and free from binding.

SIMULATED CLUTCH FILL PISTON—FIG. 5

Within the fixed sleeve 188 of the signal pressure control assembly 176, a simulated clutch fill piston 194 is reciprocally mounted to move rightwardly in the direction of an arrow 196 to an extreme position limited by a cross pin 198 fixed in the rate of rise valve assembly housing 26, or to move leftwardly opposite to the arrow's direction and bottom itself against the adjacent portion of the housing 26.

The dump valve 174 is in sole control of directing fluid to fill and to empty the piston cavity 200 of piston 194. In the valve-closed position of the dump valve 174 as shown in FIG. 5, a dump valve land 202 diverts valve cavity pressure C from the differential chamber 80 through a bore core 204 leading to the back of the piston, thence into a passage 206 and the piston cavity 200. Pressure is thus equalized across the piston 194 enabling a light spring 208 inside the head of the piston to move the latter on a complete resetting stroke in the direction of the arrow 196. But when the dump valve 174 is in the dump position to the left of the position as shown in solid lines in FIG. 5, the valve land 202 vents the bore core 204 through the bore core 180 to drain D, enabling the valve cavity pressure C of the differential pressure chamber 80 to overcome the light spring 208 and force the piston 194 leftwardly as viewed in FIG. 5 on a complete control stroke terminating in the solid line position shown.

STEADY STATE CLUTCH ENGAGEMENT—FIG. 2

C is equal to P1, P1 is equal to P, and P is 30 psi greater than pressure S, according to this dynamic equilibrium condition as shown here. The condition can be accurately mechanically set, in view of the spring chamber 84 always being maintained in drain pressure condition, also in view of the flow through the rate of rise valve modulation bore restriction or clutch fill orifice 32 being inconsequential when the clutches are fully engaged, and finally in view of the strategic placement of the spring group 88 in the spring chamber and of the valve seating spring 104 engaging the head of the rate of rise pressure modulating valve 58.

More particularly, in spite of smallness of the magnitude of flow in the direction of the arrow through the restrictive timing orifice 186, the spring group 88 is precisely calibrated so that the active one of the four control edges 170 will restrict outflow from the bore ports 172 constituting drain holes to the same restricted rate, thus maintaining the signal pressure S in chamber 82 at a constant regulated value, e.g., 270 psi (18.4 Atmos.). On the other hand, the valve seating spring 104 which is precalibrated to a moderate value, such as the equivalent to 30 psi, will act in conjuction with the same spring group 88 having the equivalent of 270 psi (18.4 Atmos.) pressure, to cause rate of rise pressure modulating valve 58 to regulate by means of the valve land 90 thereon with the total of 300 psi (20.4 Atmos.) as the pressure P. Because as noted P equals P1 and P1 equals C, the cavity pressure in the differential chamber 80 will maintain constant flow through the restricted fixed timing orifice 186 creating the 30 psi pressure drop consistent with the signal pressure S remaining at 270 psi (18.4 Atmos.).

The restrictive flow through the timing orifice 186 making its way out the drain holes 172 plus the regular leakage in the selected clutch of each of the two clutch groups amounts in total to a relatively minor flow. The corresponding minor flow through the large, clutch fill orifice 32 generates a barely perceptible pressure drop thereacross allowing pressures P and P1 to equalize.

At the time of, and only at the time of, the load piston 164 being in its normal operating position as illustrated, it will be acting with valving surfaces to block a dump port or bore core 207 from the spring chamber 84 which is constantly connected to drain D via modulating valve ports 100. Therefore a dump line branch 209 forming a restriction between the core and the converter inlet interconnection 59 is unable to divert converter pressure by dumping it to drain and unable to increase converter slip.

It will become apparent hereinafter what an extremely convenient and compact arrangement is realized here with the closely spaced apart adjacency of the port cores 92, 94, 96, and 207 on the common valve bore 34. What will be seen that the bunching accomplishes in the way of consolidated valving is that the spring connected piston 164 and valve 58 cooperatively supply the necessary full operating flow into the converter inlet line 59, supply clutch engagement pressure into the selected drive clutch cylinder line 30, and divert through drain 96 a substantial portion of the full operational flow necessary in the torque converter inlet line 59. No transmission control could be more handy, and automatic as well, for completing a power path.

DUMP, INITIATING CLUTCH FILL—FIG. 3

Fill time is so comparatively short in a shift cycle of the transmission, that the problem is to reduce the dump valve cavity pressure C to a low point and in turn reduce the signal pressure S to a low point, such that the resetting load piston 164 moving in the direction of the arrow 166 will be able fully to complete the resetting stroke before the fill portion of the clutch cycle can elapse. The complicating aspect is that the pressure P1 of the valve output fluid which restrictively enters the dump valve cavity of which the presssure is C, must have a value of about 50 psi in order that, at the clutch itself, the effective pressure PA actually filling the clutch will be about 20 psi. That is, P1 on which S ultimately depends, is comparatively too high for S's purposes. The tendency which therefore must be overcome is that the signal pressure S will be too high when, preferably, it should be at or about actual clutch fill pressure of 20 psi so as not unduly to oppose full reset of the load piston 164.

In approaching the present solution to the problem, let it be assumed a shift is being made with the transmission in first gear and with the change to be made, being made in the direction clutches, e.g., from reverse R to forward F. Hence, the clutch piston and cylinder unit 1 will remain filled whereas the clutch piston and cylinder unit F, not shown, will be empty and require complete filling. So all pressures in the system will drop drastically because 20 psi actual clutch filling pressure is all that is designed for and required by the empty clutch piston and cylinder.

P is 10 psi (0.7 Atmos.) greater than P1, P1 is equal to P2, P2 is 30 psi (2.0 Atmos.) greater than S, S is equal to C, and C is equal to actual clutch fill pressure PA (20 psi or 1.4 Atmos.), according to the condition illustrated in this figure, with substantial flow through the large clutch fill orifice 32 creating a 10 psi (0.7 Atmos.) drop therein because of the large volume of fluid temporarily going therethrough. A glance for the moment back at FIG. 1 and specifically at extended-length direction lines 56 will make it clear how fluid from direction valve spool 54 can drop 30 psi (2.0 Atmos.) in pressure from P2 to the actual clutch pressure PA by the time it arrives at the selected clutch piston and cylinder unit F.

The cascading drops in pressures PA, P2 and P1 due to empty piston and cylinder unit F on the line, and the drop in cavity pressure C due to the precipitous drop of the valve modulated first output pressure P1, results in the residual 270 psi (18.4 Atmos.) signal pressure S forcing the dump valve piston 174 in the direction of an arrow 210 in FIG. 3 to the open position causing two coordinated actions. First, the dump valve control edge 182 opens a path from signal pressure chamber 82 through bore core 180 to drain D, reducing the signal pressure S to about 20 psi and allowing the load piston 164 under force of the spring group 88 to reset leftwardly in the direction of the arrow 166. Second, the dump valve land 202 vents fluid from the piston cavity 200 and the passage 206 from the back of the piston and bore core 204, through the bore core 180 thence to drain D, enabling the approximately 20 psi cavity pressure C to move the piston 194 in the leftward direction of the arrow 210 against the minor resistance of the light piston spring 208.

So, contemporaneously with only the major first part of clutch fill, the simulated clutch fill piston 194 makes a complete control stroke, enlarging the volume of the differential pressure chamber 80 at a fairly steady rate against the opposition of the light spring 208 within the piston head. At the same time, fluid flow in the valve output connection 38 at pressure P1 will restrictedly enter the differential pressure chamber 80, through appropriate admission means such as through a hole 212 at the back of the dump valve 174, at reduced pressure. As a matter of practice, the cavity pressure C and the signal pressure S are substantially equal, with the latter pressure S (about 20 psi) being only enough the higher of the two by the minor amount necessary to keep the light valve spring 190 under compression and the dump valve 174 hydraulically held open throughout clutch fill. Flow at this time through the timing orifice 186 is essentially zero.

Under the favorable clutch fill condition just outlined, the load piston 164 will execute a complete resetting stroke contemporaneously with only the major first portion of clutch fill time, balanced against the existing 20 psi signal pressure, the spring group 88 will relax except to the extent of transmitting an equivalent of 20 psi (1.4 Atmos.) pressure, and the modulating valve 58 will be modulating the line pressure P in the range of 50 psi (3.4 Atmos.) to 60 psi (4.1 Atmos.) or so.

END OF FILL—FIG. 4

Toward the end of clutch fill, the load piston 164 as shown in this figure will have taken its extreme position of full reset and, occurring at or just after clutch fill, the simulated clutch piston 194 will according to this showing have completed its control stroke. So, inherently the differential pressure chamber 80 becomes in effect a dead-ended closed chamber because of the bottoming out of piston 194. Also, inherent with the ending of clutch fill, flow through the clutch fill orifice 32, not shown, drastically reduces, the pressure drop thereacross disappears, and the valve modulated first output pressure P1 and second output pressure P1 increase about 10 psi immediately to the pump line pressure of, say, 60 psi. The transmission dump valve 174 in its open-dump position illustrated becomes hydraulically unbalanced because of the dead-ended, closed chamber, pressure rise in the P1 connection hole 212 leading to the back of the valve 174. The valve 174 therefore shifts out away from the adjacent end of bore 34 as closed by housing 26 and to the right in the direction of the arrow 178 into the closed-seated position, causing two actions.

First, the dump valve land 202 immediately equalizes pressure across the simulated clutch piston 194, effecting a bypass around it in a path from the back of the piston 194, through the line 206 and bore core 204, thence into the differential pressure chamber 80 to which the head of the piston 194 is exposed. Second, the valve sealing edge 182 seals off the drain bore core 180 from the signal pressure chamber 82 and, via a fill path including the timing orifice 186 forming a first means of connection to the signal pressure chamber, flow of fluid commences from the differential pressure chamber 80 into the lower, 20 psi pressure S of the signal pressure chamber 82, to increase pressure S. So by this means, a first branch source of the fluid system output leading from connection 38 and an interconnecting housing connection 213a supplies the signal pressure chamber.

Immediately, hydraulic pressure on the load piston 164 will make its presence felt so as to establish starting pressure for the desired pressure rate of rise in the affected clutch, as can be understood from FIG. 5.

RATE OF RISE, STARTING PRESSURE—FIG. 5

With the valve parts in position as illustrated for this condition, the unopposed light piston spring 208 will expand and start the simulated clutch fill piston 194 in the direction of the arrow 196 to reset the piston against the stop pin 198. Also, the rising signal pressure S will about simultaneously increase its force and start the load piston 164 in the direction of the adjacent arrow on its load stroke.

At outset of movement of the load piston 164 on the load stroke during its shifting status, compression will increase in the relatively relaxed spring group 88, communicating the force to the modulating valve 58 and causing the valve land 90 to commence restricting outflow from the bore core 92 which carries pump line pressure P. There thus begins a linear rise of pressure P and, proportionately, a linear rise of the pressures P1, P2, S, C, and PA.

Therefore, as the piston 194 in FIG. 5 completes its resetting stroke and the load piston 164 completes its load or control stroke, the spring 104 maintains a continuous 30 psi differential of the linearly rising pressures C, P1, and P2 above signal pressure S, the differential pressure across the timing orifice 186 remains constant at 30 psi, the flow rate through the orifice 186 remains constant throughout the pressure rate of rise, and the rate of movement of the piston 174 stays constant throughout the linear pressure rise, which occurs at constant rate for each load or control stroke of the piston 164. That is to say, for a given stroke the rate of rise of pressure does not change although the rate of one stroke may differ from other strokes for reasons hereinafter set forth.

When reset, and at all other times of shifting to and from its normal steady state operating position, the load piston 164 leaves the port or bore core 207 uncovered. This shifting status of piston 164 exists of course during and only during each transmission shift, and several things are occurring in the torque converter, not shown, as the transmission goes into neutral while shifting. The bore core 207 starts a bypass to drain of the original fluid (e.g., 25 gpm or 95 liters per minute originally) normally supplied to the converter inlet, not shown, and so up to 10 or 12 or half of the gallons per minute of all converter oil are being dumped to drain through the restricted branch line 209, with only the remaining oil going to the converter. The converter itself, not shown, will have no torque on it and stay unloaded until after the neutralized transmission reengages.

So, consequently, not only do the normal converter inlet pressure of 45 psi (3 atmospheres) and normal inlet flow of 25 gpm reduce transiently to lower values naturally, but also the rotating converter begins to act as an hydraulic pump so as to draw down its inlet connection pressure even lower. The converter back pressure regulator, not shown, will be unable to maintain the 37±2 psi (approximately 2.5 atmospheres) to the prior extent maintainable in the first place, and so a decrease in back pressure of at least about 5 psi (0.3 atmospheres) can be expected at the outlet connection of the back-pressure-sensitive torque converter. In other words, the torque converter is effective in imposing on itself self-emptying and cavitation, making it unable to transmit to the reengaged transmission except at lower torque with high %-age slip.

In the desired way, the result is that the torque converter is conditioned to a substantial torque transmitting capacity yet appreciably diminished below full capacity. Shiftshock, as and after the transmission shifts, will thus be materially reduced if not substantially eliminated because the vehicle engine cannot suddenly impose full load on the transmission.

For better perspective, consider a first transmission neutralizing factor and appreciate that the converter output shaft will be unloaded by the transmission in neutral and hence the converter turbine speed will immediately rise and stabilize at a high value. For that reason and other hydrokinetic reasons, a converter experiencing no drop in back pressure will actually serve to add torque, comparatively, due to its presence when the transmission reengages; the transmission will receive a shock under the sudden, high speed, high torque load imposed thereon.

For even better perspective into the problem, consider a combination of the first transmission neutralizing factor and a second direction-change-shift factor involved both at the same time in the transmission. Reversing the transmission while in neutral would have the vehicle traction drive of the coasting vehicle trying to establish one rotation while the speeded up converter output shaft would be trying to establish an opposite rotation, all at the same time in a transmission just reversed and attempting to reengage; the shock upon re-engaging will be appreciably more severe than occurs according to the immediately preceding paragraph.

My invention's mollifying quality is evident, evident even when the foregoing first and second factors are present in combination. An operator, in reversing the direction of a vehicle with transmission equipment therein embodying my invention, has recorded that moving the range control (54) past neutral has caused the converter turbine in the course of 0.3 sec. to drop in positive speed from an initial 2,200 or 2,300 normal operating r.p.m. so as to undergo a first motion-reversal to a negative turbine speed of 1,000 r.p.m. in accommodating to the reverse re-engagement of the transmission; such quick, shock-free slip accommodation in a high-efficiency converter is explained by the instantaneous action of the converter acting as a very efficient pump at the time input flow thereto automatically is about halved according to the principles of my invention. What the converter does is start pumping with a flow effort readily outstripping input flow and seemingly to try to pump itself out.

The 0.3 sec. example just given is only illustrative of the length of the time period to show how very transitory it is during a transmission shift, and immediately thereafter the automatic doubling of converter input flow to restore it to full operating value will cause a second reversal of the converter turbine motion so that the turbine will be brought into rotation once again in a positive direction and resume its initial 2,200 or 2,300 normal operating r.p.m. previously noted. Contrasted with the relative abruptness expected with friction disk engagement, fluid slip in the torus of an automatically controlled converter makes for two comparatively easy and smooth adjustments foregoing, absorbing all drive line shock by readily adapting to the two closely timed turbine motion reversals simply by changed courses and concentrations of internal fluid flow in the torus flow section.

Converter speed ratios are commonly stated as partial fractions or decimal fractions, rising here, say from a small positive decimal immediately following transmission engagement to a large positive decimal such as 0.800 (relatively low converter slip, all at about 80% efficiency) during a speed change within the forward range, for example. An uncommon aspect in the practice of my invention, however, is that the speed ratio rise effected automatically here after transmission reversal begins with a negative partial fractional value or negative decimal fractional value immediately following clutch engagement and the converter must actually swing through zero speed simulating a quasi stall speed driving ratio before rising thereabove and settling into some normal operating speed ratio for the converter such as 0.600 or 0.800, as examples for an 80% converter operating efficiency.

LOAD PISTON—FIG. 6

The referred to uniplanar four spaced control edges about the crown of the load piston 164 form part of eight consecutive outside portions thereof, alternate ones of which are the same flats 214 defining the sealing control edges 170, and each remaining one of which is a land 216 retaining its original cylindrical shape and being identical to the other three lands.

The four sealing edges 170 control the bore ports 172 constituting drain holes and, in practice, the drain holes as superimposed in FIG. 6 subtend a central angle slightly in excess of the arcuate width, measured in a circumferential direction, of each of the lands 216. Irrespective therefore of the rotative position of the load piston 164 in bore 34, not shown, one sealing edge 170 will have a bore port 172 aligned in its path of reciprocation so that, by unblocking same, the sealing edge 170 concerned will determine the end of travel of the load piston 164 on each load stroke at the same point essentially.

Hydraulic balancing or centering grooves 218 are in the skirt, formed at spaced locations in the exterior of the load piston 164 adjacent its open end. The skirt squarely aligns with the converter dump port or bore core 207, not shown, to block it off whenever the load piston 164 occupies its normal, steady state operating position.

RATE OF RISE CURVES—FIG. 7

Without provision for my full-reset principle just described, clutch pressure at end of fill can be substantially high due to incomplete recycling of the load piston, not shown, as illustrated by the broken line rise curve 220 in this figure. That is to say, the end of fill point 222 on the curve 220 represents a residual 100 psi (6.8 Atmos.) pressure, and the modulated rate of rise will thus start off at too high a level to effect clutch engagement properly. Under my novel principle, however, the load piston is ready for a complete control stroke at the point close to, but always after, clutch fill when the dump valve shifts to the right and the simulated clutch piston starts resetting movement back to its starting position; then, the rate of rise proceeds in the desired smooth way for the full length of the solid line rise curve 224. The end of fill point and piston bottoming are shown for convenience as coinciding at 226 on the curve 224 and that point represents the desired 60 psi (4.1 Atmos.).

SPECIAL APPLICATION—FIG. 1

In one physically constructed embodiment of the invention, the rate of rise valve 58 had a design of substantial size to be useable with transmissions of the larger commercial sizes. For application to such larger sized transmissions, which can be considered a special application and well suited to tractors, particularly crawlers, the connection 213a is shown in FIG. 1 as a single-leg conduit component, which properly handles both egress and ingress of fluid for the respective open-dump and closed-seat directions of movement of the associated dump valve 174. So no restriction means are additionally necessary for auxiliary fluid handling means are additionally necessary in controlling speed of movement of the dump valve 174. Therefore, the third branch source of system fluid output for chamber 80 as illustrated in FIG. 1 is unnecessary, and a valve-48-to-chamber-80 interconnection 221 as shown in the housing 26 can readily be eliminated, preferably so.

GENERAL APPLICATION—FIG. 2

When a design of a rate of rise valve 58 of such substantial size mentioned is applied more generally, suitable as well for smaller transmissions having quickly filled, small clutch cylinders, the length of the time periods during a shift cycle are necessarily altered; the sequences change phase somewhat and certain structural modifications are found to prove beneficial.

As an example, the selected clutch cylinder of smaller size fills comparatively very fast, with the result that the modulation bore restriction flow at 32 stops relatively prematurely and the first output pressure P1 quickly rises about 10 psi (0.7 Atmos.) to reach the pumpline pressure P at which the pressure P1 stays. Such pressure fluctuation occurs with the load piston 164 still resetting itself and with the clutch simulating piston 194 still negotiating and being only partway along in the direction (leftwardly as viewed in FIG. 2) of its control stroke. So the fill cycle in effect continues for a while as the simulated clutch piston 194 and piston 164 keep moving, even though the clutch itself is already filled.

Also, without the structural modification referred to, the dump valve will tend to move fairly unrestrainedly to the closed-seated position immediately upon termination of the fill cycle as caused when the simulated clutch piston 194 bottoms out at end of its control stroke. At that point, essentially where modulation starts, the signal pressure S will tend to undergo an unwanted pressure rise of the order from perhaps 45 psi (3.1 Atmos.) to 65 psi (4.4 Atmos.) rather abruptly; in a smaller vehicle equipped with a smaller transmission as referred to, the start-up of the vehicle from a stopped position will sometimes be less smooth than desirable, because of a consequent slight jerky clutch engagement.

Accordingly, as modified for the more general purpose application, the interconnecting housing connection 213b is illustrated as a two-leg conduit component in FIG. 2, wherein a lower leg 223 thereof is shown hydraulically in parallel with an upper leg 225 incorporating a calibrated restriction 227. Then at or about the outset of modulation as determined by the bottoming out of simulated clutch piston 194, the comparatively slow, thus restricted flow from the first branch source of the connection 38 to the differential chamber 80 will more gradually move the dump valve 174 to the closed-seated position and thus impart a rise in pressure S of only the order from perhaps 45 psi (3.1 Atmos.) to only about 50 psi (3.4 Atmos.); regular modulation then raises the pressure linearly and the vehicle starts up without discernible jerk, in the desired way.

The restriction 227 necessitates two minor adjunts as preventatives.

One adjunct is the housing connection 221 to prevent the problem of the dump valve 174 floating and sometimes failing to complete its closed-seated stroke when vehicle direction changes are made in 2d or 3d gear setting. My solution is that the connection 221, on one side and the connection 122 on the other side of the dump valve 174 tend immediately to equalize the pressures fed thereto by the speed valve 48 (not shown) when in 2d or 3d gear, so that the dump valve spring 190 will unopposedly cause the dump valve to continue its movement once started, into the closed-seated position as desired. The equalization is brought about because the speed spool land 120, on reaching speed 2 position or passing therethrough to speed 3 position, uncovers the mouth of the connection 221 at the same time at which, and in the same way in which, it uncovers the mouth of the first auxiliary passage 122 as previously described.

The other adjunct, appearing in FIG. 2 in the lower leg 223, is an interposed spring loaded, ball check valve 229 to prevent any noticeable delay of the dump valve 174 in moving to dump position. Therefore, "dumping" of the dump valve to the left as viewed in FIG. 2 displaces oil, forcing the valve 229 to uncheck and unseat, and readily dumping oil through lower leg 223 toward the lowered pressure P1 in the connection 38 then leading to an empty clutch.

DIRECTION SHIFT ONLY—FIG. 1

The foregoing operation, discussed under the transmission dump heading for initiating clutch fill, and also under the succeeding end of fill and rate of rise headings, was presented under the illustrative circumstance of going from reverse R to forward F while the transmission has a first gear setting.

This direction-change shift capability of the reversible transmission 10 hereof represents only one of the transmission's power shift drive capabilities. Its opposite, going from forward F to reverse R still while in first gear, will complete our consideration of the first gear direction cyle. The description of how it can transpire is analagous to, and can be readily deduced from, the foregoing discussion.

DIRECTION SHIFT WHILE IN 2D GEAR SETTING—FIGS. 7, 1, 2

While the end-of-fill point is critical insofar as pressure is concerned, the previously described shorter rate of rise interval I1 is not in and of itself undesirable. That is to say, the desired rate of rise interval I2 indicated in FIG. 7 may be effectively shortened in a manner now to be described, without sacrifice of a smooth clutch engagement.

Instead of conforming to the curve 224 in FIG. 7, the pressure trace will desirably have a steeper straight slope than shown by the curve 224 when a direction change is made while the transmission 10, not shown, remains in second gear. That is, in the higher speed gear compared with first gear, a speed clutch change is not felt so abruptly; hence the speed clutch can go into engagement smoothly at a relatively higher constant rate of rise of pressure, and the interval I2 will consequently be shorter.

In FIG. 1, the speed valve spool 48 in the way described has the speed 2 position wherein the spool land 120 uncovers the mouth of the first auxiliary passage 122 which is in reality an orifice. Such orifice provides a second means of connection to the signal pressure chamber 82, supplementing the timing orifice flow described already as the first means of connection to the signal pressure chamber 82.

In FIG. 2, the orifice formed by the first auxiliary passage 122 communicates restricted flow through a gallery into a bore core 228, thus feeding the signal pressure chamber 82 and establishing a new larger fixed rate of flow whereby the load piston 164 moves on load stroke at a faster constant rate, for a correspondingly shorter period of linear rate of pressure rise of both the signal pressure S and the valve modulated first output pressure P1. So the rate of rise interval I2 earlier described will be shorter but will cover the same full range of pressure, namely, from roughly 60 psi (4.1 Atmos.) as previously to 300 psi (20.4 Atmos.) as previously.

SHIFT INTO THIRD GEAR—FIG. 2

When the transmission 10, not shown, is upshifted into third gear, the subsequent rate of rise in pressure following fill will be established not only, as described, by the first and second means of connection to the signal pressure chamber 82, but also by a third means of connection consisting of the second auxiliary passage 124 which is more or less unrestricted and which communicates essentially the full pressure P1 through a gallery and into the bore core 228 which feeds the signal pressure chamber 82. Although the end points of the rate of rise curve 224, not shown, have the same pressure ordinates at start and finish, the slope is made much steeper and the constant rate of pressure rise is an appreciably larger figure. In other words, a shift when speed 3 is involved can be made both rapidly and smoothly, albeit in the shortest rate of rise interval I2.

SPEED CHANGE IN SAME RANGE—FIG. 1

Speed changes such as the foregoing can be made from among the selected ones of the piston and cylinder units 1, 2, or 3, all in the same range, without disturbing the direction valve spool 54, which can be left remaining in the forward position F, for example, as shown in FIG. 1.

Hence, the clutch filling process will involve only the selected speed clutch, and the clutch F will remain filled during the change speed.

SHIFT CYCLE PRESSURE CURVES—FIG. 8

The solid line curve 230 repesents the pressure trace for valve output P1 and also valve output pressure P2 during a full cycle. The broken line curve 232 represents the signal pressure S trace for the same cycle.

Following the pressure drop of both pressures at the outset of a shift, represented as essentially vertical straight lines at the extreme left, the simulated clutch fill piston 194, not shown, insures an approximate 30 psi differential of the pressure P1 over the signal pressure S during the immediately ensuing fill interval FI.

Following fill, the sharp 10 psi pressure rise reflected at 234 in the solid line curve 230 and reflected at 236 in the broken line curve 232 is due to the sudden drop in flow upon filling of the clutch involved. That is, both pressures rise by about the amount of pressure rise across fill orifice 32, not shown, which no longer will generate any appreciable drop thereacross.

The major portions of the curves 230 and 232 representing the modulated linear rates of rise of pressure and also those horizontal portions representing the equilibrium time E1 at full clutch pressure show a constant differential of about 30 psi between the pressures P1 and S due to the equivalent 30 psi mechanical compression residual in the modulation valve spring 104, FIG. 2. The equilibrium time endures throughout each normal operating period of transmission while in drive.

SIMULTANEOUS SHIFT—FIG. 8

In a shift requiring that the transmission go from a condition of, for instance, R1 to F2, both the speed spool 48 and the direction spool 54, not shown, are newly positioned and newly detented in their respective new positions. The piston and cylinder unit F and also the piston and cylinder unit 2 require filling, so that the normally rather short fill time F will appear on the pressure trace as just about twice as long an interval as the previous fill time F1 discussed in connection with FIG. 8. Otherwise, the rate of rise modulation curves will appear the same and both clutch engagements will occur in the desired way.

It will be apparent from the foregoing that my novel full-reset arrangement makes the scheduling function independent of the variables of the system such as line resistance, pressure drop, and clutch piston displacement. Hence, the starting rise pressure will always be at a reduced level in the scheduling cycle so that each shift tends toward smooth clutch engagement. Almost as soon as the clutch cylinder or cylinders complete filling each time, the dump valve will shift rightwardly as shown in the drawings into fully closed position, and the simulated clutch piston after bottoming will reset rightwardly to its starting position as viewed in the drawings, all ready for the next shift. In effect the piston 194 located inside sleeve 188 within the dump valve cavity, FIG. 5, is like a small clutch piston being subjected to an equal or at least an equivalent pressure during clutch fill as the clutch of the selected group or clutches of the selected groups are being likewise subjected. Therefore despite its relative hydraulic remoteness to the latter, the rate of rise valve assembly in housing 26 essentially knows the actual clutch pressure PA because PA is artificially approximated close-by, by the level of cavity pressure C in the differential chamber 80.

BACK PRESSURE REGULATOR 61—FIG. 9

The regulator valve 61, which is supplied with oil by the converter outlet line 63 and delivers the oil to the converter cooler inlet connection 68, has a bore with a back pressure chamber 238 therein located between a bore end plug 240 and an internally passaged reciprocal regulator spool 242. The spool 242 is controlled by converter back pressure in the chamber 238 at one end, and by a calibrated regulator spring 244 located in a drain chamber 246 and biasing the spool at the latter's other end.

REGULATOR OPERATION—FIG. 9

Because of the internal passaging in the spool 242 as illustrated in the valve of this figure, back pressure from line 63 will be communicated to chamber 238 and force the spool to seek a dynamically balanced regulating position somewhere between the broken line and solid line positions of spool 242 as shown in FIG. 9. Upon initial outset of its movement to regulate, the spool's land 248 in the bore will shift and intercommunicate the line 63 and connection 68 leading to the cooler, not shown, thus directing all flow from the converter to the cooler. However, back pressure in excess of approximately 37 psi (255 kPa or 2.5 Atmospheres) will institute pressure regulation so that, against the resistance of the spring 244 the spool will move and carry a spool end land 250 into a cracked-open, regulating position, not shown. Converter back pressure is then vented by flow of diverted oil into the valve drain chamber 246, thence via the drain outlet line 78 to drain D.

Because the converter operation will increase to relatively high slip with decreased back pressure due to its sensitivity to the latter, i.e., inversely thereto, it is evident provision can readily be made if the valve 61 is sufficiently large to retractively, by hand, shift the fixed end of spring 244 in a direction to temporarily reduce the bias on spool 242 throughout each shift. Or provision can be made with sensing mechanism in the transmission for automatically doing so when a shift is taking place in the transmission, all to transiently multiply slip in the power train and thus materially reduce the shift shock.

Immediately thereafter, the back pressure under either of those circumstances will be restored to normal level so as to stiffen the converter to slippage and restore full torque transmitting capacity to the now shifted power train. However, in practice the valve 61 is sized with too small a bypass capacity to handle the bypass flows necessary.

The simple internal modification shown in 207 of the rate of rise valve assembly 108 as it appears in FIGS. 2 and 5 accomplishes the same thing, however, and novelty is felt to reside therein because no manual effort is required, no additional pressure or flow control device or sensing mechanism is required, and coordination with an exact time delay interval for optimum performance can be made inherent, as will now be considered.

CONVERTER AND TRANSMISSION COORDINATION—FIG. 10

The graphed upper converter-flow curve and lower transmission clutch-pressure curve can be coordinated along a common elapsed time abscissa axis as illustrated in this figure on the basis of the known torque characteristics of the converter and the known clutch capacities of a given transmission power train.

More specifically, a normal flow horizontal segment 252 of the converter flow curve and a normal engaged pressure horizontal segment 254 of the selected clutch pressure curve correspond to the steady state operating condition of the transmission while in drive and of the modulating assembly 108 in its position as shown in FIG. 2, hereinabove discussed.

With onset of the flow and pressure changes at the beginning of the making of a transmission shift, during which the modulating assembly 108 undergoes movement to the point as, and in the direction as, illustrated in FIG. 3 at the outset, the converter flow rate drops according to a diagonally declining curve segment 256; at the same time the selected clutch pressure drops according to a steeply diagonally declining curve segment 258, and then rises partway and plateaus according to a slightly diagonally inclining curve segment contemporaneous with the cylinder fill inteval FI which endures until one or both of the selected cylinders are completely replenished with oil, depending upon the shift circumstances.

From their fully reset, shifting position as shown in the already described FIG. 5, the modulating valve 58 begins its rate-of-rise stroke and the load piston 164 begins its control stroke, both to load the valve 58 and complete the transmission shift, and to stiffen the converter against its transient high slip. That is to say in shifting status, the open modulating valve 58 awaits in full readiness: with a hydraulic supply connection to the selected, filled cylinders; reciprocally mounted to shift in the end of the common bore 34; with the modulating spring group 88 extending therepast toward the load piston 164 and signal pressure chamber 82; and the coverable core 207, port, and restricted branch 209 therepast in the bore connected via line 59 to the torque converter inlet line 70, not shown.

At the time of the foregoing shifting movement starting from full reset position of the modulating assembly 108, and while the clutch pressure is accomplishing first its post-fill, slight, short abrupt rise according to the diagonal curve segment 260 of FIG. 10 and second its straight line, uniform-rate increase, rate-of-rise according to the long diagonally inclining curve segment 262 leading to the horizontal flat segment corresponding to clutch and valve equilibrium time denoted E1, the converter inlet flow is going through three phases.

First, the diverted and depressed converter flow stabilizes at a fixed flow of about half the normal operating rate according to the long, horizontal curve segment 264. Second and approximately timed with but after clutch engagement has stopped clutch slip and is well along toward attaining full clutch engagement pressure, the travelling load piston 164 begins covering the intersecting port from restriction 209 and the core 207 which are squarely along its line of travel as shown in FIGS. 2 and 3. Converter flow is no longer diverted and the rate of flow steeply rises according to diagonally sharply inclined curve segment 266 in FIG. 10. So the back-pressure-sensitive converter, which has a steep torque rise characteristic with increasing back pressure, experiences a substantial increase in back pressure thereon as the latter is restored toward its normal operating level; the high slip is thereupon overcome, and the converter restores full torque transmission in the vehicle power train. Therefore third and approximately timed with but slightly before full clutch engagement pressure is attained in the power path through the transmission, the normal low slip, full operating torque, full flow necessary is reached and maintained in the torque converter according to the constant flow, horizontal flat curve segment 268 in FIG. 10.

In the situation where a converter has such a high performance to offer in a well compensated transmission that the stiffness in the converter itself can contribute the shift shock therein, and in other torque converter transmission situations or special or a more general nature, the practice of my anti-shift shock sequence can be seen in its final phases to introduce a unique hydraulic shift completion stage, to wit, shift completion in the converter wherein only the pressure and flow of an hydraulic stream are adjusted, and no jaw clutches for interengagement are present nor clutch or brake disks for friction engagement. In other words in my novel always-being-filled, two-speed or two-step converter operation, the converter is "shifted" to high slip in preparing the power train whereupon the engaging clutches then complete the preparation of the power path for the transmission; only then and almost immediately, the converter is restricted back to normal low slip operation and, without shock, hydraulically picks up the full load. So in completing preparation of the power path, the engaging clutches do so by picking up only part load and without shock, and the final shift is relegated to and accomplished solely in the converter, and simply dependent upon a high slip, low slip two speed characteristic and without physical shift or wear on the drive-path completing parts.

The two novel elements which are synergistic as they act in conjunction here are the dump of clutch cylinder pressure always automatically completely down to the bare clutch fill pressure which will come from the valve 26, and the dump of the converter back pressure consistently automatically at least down toward zero turbine output speed at times but sometimes below zero output speed when the load drag on the turbine makes it to a substantial degree reverse its rotation.

Coordination of my two elements of novelty always affording smooth shifts is insured by the dual function, full stroking load piston of FIG. 6. During each course of a complete shifting status of that piston, it consistently fully resets itself so as to cause the clutch engagement pressures to be extended each time over the full pressure range necessary irrespective of length of the rate of rise interval I2 which is appropriate. Then while completing the last of the shift at or after the point of pressure rise when all slip is gone from the slow turning, relatively unloaded selected clutches, the piston restores full converter flow to bring the converter output back up to applying full speed and power to the already engaged transmission.

In other words in the practice of my invention, the step-up or upshift at the last instant, of converter output speed and torque, is naturally more "fluid" and smooth than comparative engagement under power of friction disks to undertake the full load. The converter fluid, with the obvious damping or cushioning inherent in an oily transmitting liquid, functions always to transmit some torque through the converter; even when starved down to half normal flow, the converter nonetheless continues to receive at least about its half gallonage of input flow.

The invention is disclosed herein as having several specified ways to transiently reduce back pressure on the back-pressure sensitive, high performance torque converter employed. Diverting part of the converter inlet flow before it gets to the converter is one of the specified ways. It is evident that tapping off a significant part of the outlet flow at a point between converter outlet and back pressure regulating valve, and venting that part as diverted oil to drain will likewise reduce back pressure; so far then as its broader aspects are concerned, my invention therefore comprehends a connection made to, and flow diversion and/or pressure reduction in, either the inlet or the outlet of the converter to transiently increase slip and reduce output speed and torque. Self-evidently, the automatic time delay interval inherent in the constant speed load piston encountering, first in the path of its stroke, the shift spring group to cause solid clutch engagement and, second it its path, the converter dump port terminating the restriction 209, will always insure completion of a fully engaged transmission drive condition before the converter can start to stiffen to normal slip from a high positive slip condition at times or sometimes a negative-rotation slip condition.

In one physically constructed embodiment of the invention, the clutch pistons and springs of the speed clutches 1-2-3 were constructed, proportioned in size, and arranged to operate at a lower design pressure than the clutch pistons and springs of the direction clutches F-R. So the selected one of the 1-2-3 clutches under pressure P1 always operated so as to be fully engaged before the pressure P2 would fully engage the selected one of those last-to-engage F-R clutches.

In overall sequence for purposes of a power shift therefore, my system provides, first, the means to condition an engaged transmission into a neutral setting with its first and second sets of clutches unengaged, and the means to condition the transmission's torque converter to a torque transmitting capacity substantially diminished below full capacity for appreciably increased slip; second, means automatically to restore a selected one of the second clutches to full engagement in the transmission with but after a selected one of the first clutches is fully engaged therein; and third, means automatically to restore the torque converter to full torque capacity with but after that selected one of the second clutches is fully engaged in the transmission.

The last-to-engage clutch (F or R, herein) will fully engage at a point approximately at or else corresponding to the time of peak shift torque experienced by the transmission; in comparison to what the first to engage clutches are designed for, the last-to-engage clutches will consequently have by far the larger heat absorbing clutch area and higher heat energy dissipating capacity. So consider what occurs when the brake pedal 148

(FIG. 1) is depressed, in view of the brake-neutralized F-R clutches having the high dissipation capacity. The brake-disengagement of the F-R clutches, as accomplished in the way described through the neutralizer valve component 144 (FIG. 1), prevents completion of the transmission power path despite the fact of the power path already standing prepared by the engaged one of the 1-2-3 clutches in the transmission. That is to say, the neutralizer valve component 144 blocks off the pressure P1 coming from the tee 36 and at the same time dumps the F-R pressure P2 at 40 to drain D. The emptied clutches F-R therefore require refilling whenever the brake-deactivated neutralizer valve component 144 subsequently reconnects the selected clutch F or R back onto the line.

In other words, the downstream pressure P2 into the reconnected selected F or R clutch has a drastic pressure drop, when the brake pedal is released, the upstream pressure P1 communicated to the downstream pressure P2 experiences an identical drop in pressure, the dump valve chamber C supplied at 212 by pressure P1 has a like drop in pressure, and consequently the dump valve 174 due to the collapsing chamber C starts its dump motion as illustrated in FIG. 3; dump motion of the dump valve 174 forces the rate of rise valve and load piston 164 into the shifting status as shown, such shifting being from their normal position always occupied during normal transmission operation preceding a vehicle shift or the vehicle brake engagement and release just considered. Therefollowing, the selected F or R clutch operates by reengaging with its expedient of high heat dissipation in the same way discussed under the direction shift only subheading which was devoted to FIG. 1.

Variations within the spirit and scope of the invention described are equally comprehended by the foregoing description.

What is claimed is:

1. In a rate of rise valve assembly for an hydraulic torque converter (14) transmission, said transmission provided with an hydraulic cylinder operated friction device (F) selectable to establish drive and affording a power shift drive capability including at least one of direction-change shift capability and of change-speed shift capability, said hydraulic torque converter (14) having at least one higher slip condition below normal slip at full operating capacity, said assembly having a bore (34) with a signal pressure (S) chamber (82) spaced from a bore end (86), rate-of-rise modulating valve (58) in the end (86) of said bore connected to the cylinder of said selectable device (F) and having a load-piston-loaded modulating valve spring (88) projecting therepast toward said chamber (82), and a piston-coverable bypass port (209) also therepast in the bore connected to one of the inlet-outlet connections on the hydraulic converter to bypass same to drain when the port is open and cause a transient high slip, moderate torque capacity condition in the converter:

the improvement of a dual function load piston (164) which is movably mounted in said bore (34) intermediate said signal pressure (S) chamber (82) and modulating valve spring (88) and which, along with its movement toward said end (86) of the bore (34) and toward covering the bypass port (209), is at the same time proceeding in a direction causing a cylinder pressure rate of rise by increasing at unvarying rate the loading pressure on the modulating valve spring (88).

2. A low shift shock, hydraulic torque converter (14) transmission affording a shift capability including at least one of direction-change shift capability and change-speed shift capability, and including a transmission shift control element (164, FIG. 6) having a normal position during normal transmission operation following a shift, and a shifting status when out of said position during a transmission shift;
said transmission further including power shift devices and friction disks in each of said devices and coming into engagement when such device is selected and effects a shift;
said hydraulic torque converter having inlet (70) and outlet (63) connections including means therein controlling their flow and their respective inlet-pressure and back-pressure maintained in the converter; and
means connected to one of said converter connections (70,63), effective when said transmission shift control element is in its shifting status, to reduce pressure in said connection of said converter to effect a transiently diminished torque capacity so that the selected friction disks as controlled by the transmission shift control element will be coming into engagement before the converter (14) is ready to transmit full torque.

3. The invention of claim 2,
wherein the back pressure primarily determines the magnitude of torque transmittable through the converter,
said one connection to which said connected means is connected consisting of the converter inlet (70).

4. The invention of claim 3,
said connected means comprising a drain-connected bypass port (207) effective during transmission shift to diminish converter inlet pressure, through a partial diversion of inlet flow by bypassing it to drain, whereby to transiently diminish converter back pressure and torque transmitting capacity.

5. The invention of claim 4,
said control element (164) and said bypass port (207) establishing cooperation by presenting mating valving surfaces, the diversion in the converter inlet depending for start and stop of flow upon the valving-open and valving-closed condition of the bypass port, and depending for its relative quantity of flow upon a restriction (209) in the path of flow defined by the bypass port, bypass, and drain.

6. The invention of claim 5 characterized by:
a transmission rate-of-rise valve assembly having means cooperating therein to provide clutch pressure modulating valve output (30) and including a modulating valve load piston;
said power shift devices (RF 123) each selectively connected to receive clutch pressure modulating valve output;
said load piston constituting the transmission shift control element (164).

7. In an hydraulic torque converter transmission having control valving including a valve and a piston confrontingly disposed, slidably related, operatively connected for interaction, and establishing cooperation as a load-piston-controlled modulating valve and a modulating valve load piston to control transmission hydraulic operating lines, said transmission further having a first operating line connected to the hydraulic torque converter inlet, and a second operating line and selected friction drive cylinder connected thereto for engagement of the selected transmission drive under hydraulic pressure, the combination with the slidable valve (58) and piston (164), and a bore (34) common thereto, of closely adjacent spaced apart means including:

- a port (94) in said bore for supplying said first line (59) with the necessary full operational flow for the torque converter and controlled by said load-piston-controlled modulating valve;
- a port (92) in said bore for supplying said second line (30) with engagement pressure for the selected friction drive cylinder and controlled by said load-piston-controlled modulating valve; and
- a port (209) in said bore for diverting to drain from said first line (59) a substantial portion of the full operational flow necessary for the torque converter and controlled by said modulating valve load piston.

8. In controls for a low shift shock, hydraulic torque converter transmission affording a shift capability including at least one of direction-shift change capability and change-speed shift capability, and including power shift devices each selectively connected to receive clutch pressure modulating valve output, and arranged with friction disks coming into engagement therein when such device is selected so as to effect the shift, said hydraulic torque converter having inlet and outlet chambers sensitive to means controlling their flow and their respective inlet-pressure and back-pressure maintained in the converter, the combination comprising:

- means (70, 63) of connection to the converter (14) inlet and outlet chambers;
- a rate of rise valve assembly (26) including a clutch pressure modulating valve (58) and signal pressure control means (176) oppositely disposed and both reciprocally mounted in a bore (34) formed by a valve housing, with the clutch pressure modulating valve in a first end and the signal pressure control means in a second end of the bore, said valve being arranged to afford flow of the valve assembly output, out of pumped fluid supplied thereto from a pump source (12);
- a load piston (164) in the bore intermediate its first and second ends, and arranged with the signal pressure control means to form a signal pressure chamber (82) therebetween in the bore:
- spring means (88) arranged for loading interaction between the load piston and said valve (58);
- said signal pressure control means having a differential pressure chamber (80), and having first means (186) to transfer timing fluid from the differential pressure chamber to the signal pressure chamber for causing in one shift phase a control stroke of the load piston in a direction against the spring means and to the point of the normal operating position (FIG. 2) thereof attained, and second means (174) for venting, in another shift phase, signal pressure to reduced value to reset the load piston during actual clutch fill, said differential pressure chamber being included in said signal pressure control means and with a simulated clutch fill piston therein movable to a chamber-enlarging position affording an enlargement of volume of the differential pressure-chamber during actual fill;
- admission means (212) connected between the valve assembly fluid output and differential pressure chamber whereby, during actual clutch fill and corresponding enlargement of the chamber by the simulated clutch fill piston therein, to admit the valve assembly output fluid to the differential pressure chamber at reduced pressure equivalent to signal pressure, effectively equalizing pressure across the signal pressure control means and enabling the load piston to fully reset in said other shift phase against the equivalent of actual clutch fill pressure; and
- means (FIG. 2: 59, 209, 207, 100, D) connected to one (70) of said converter connections, effective when said load piston is in shifting phase, to reduce pressure in said connection of said converter to effect a transiently diminished torque capacity (264, FIG. 10) so that the selected friction disks will be coming into engagement before the converter is ready to transmit full torque.

9. The invention according to claims 1, 6, 7, or 8, characterized by:

- said load piston having opposed faces, one face of which is exposed to drain pressure and an ongoing spring bias, and one face of which alternately communicates with a timing orifice under pressure and with drain pressure for effecting piston strokes respectively of motion of advancement and of retrograde motion with respect to the spring bias.

10. Method of operating an hydraulic torque converter transmission shock free as it undertakes to drive a load, said transmission affording a power shift capability including at least one of direction-change shift capability and of change-speed capability, said hydraulic torque converter having at least one diminished torque capacity condition below full torque capacity condition, said method comprising the steps of:

- conditioning the transmission into a neutral setting and conditioning the hydraulic torque converter to a torque transmitting capacity appreciably diminished below full capacity for appreciably increased slip; and
- automatically restoring the torque converter to full torque capacity with but after starting to engage the transmission for establishing transmission drive.

11. Automatically timed method of operating an hydraulic torque converter transmission shock free as it undertakes to drive a load, said transmission affording a power shift capability and the converter thereof having at least one torque capacity condition below full torque capacity condition so as to slip appreciably, said timed method comprising the steps of:

- contemporaneously conditioning the transmission from one engaged drive condition to a neutral setting and conditioning the hydraulic torque converter to a transmitting capacity appreciably below full capacity for appreciably increased slip;
- creating an automatic, discrete time delay interval; and
- restoring, one, the transmission to engagement to another drive condition by power shift and restoring, two, the torque converter automatically to full torque capacity in one-two order respectively and always with the automatic, discrete time delay intervening as an anti-shift-shock precaution.

12. For use with a transmission providing a power path including an hydraulic torque converter, and including first and second sets of clutches engageable in sequence always in that order, an automatic method of operating the transmission as it undertakes to drive a load, said transmission affording power shift capabilities including a direction-change shift capability with one of the sets of clutches and change-speed capability with another of said sets of clutches, said hydraulic torque converter having at least one diminished torque capacity condition below full torque capacity condition, said method comprising the steps of:
 conditioning the engaged transmission, for purposes of the power shift, into a neutral setting with the first and second sets of clutches unengaged and conditioning the hydraulic torque converter to a torque transmitting capacity substantially diminished below full capacity for appreciably increased slip;
 automatically restoring a selected one of the last-to-engage second clutches to full engagement in the transmission with but only after a selected one of the first-to-engage first clutches is fully engaged therein; and
 automatically restoring the torque converter to full torque carrying capacity with but only after said selected one of the last-to-engage clutches foregoing is fully engaged.

13. An hydraulically operated transmission system comprising:
 a coupled together torque converter (14) and transmission (10) the latter having friction engageable drive means (1,F) engageable in selective sequence (1,F) by individual power shift transmission cylinders (1,F) operable to execute a shift of the transmission (10);
 a pressure fluid line (24) with separate branches (59, 40) of supply to the converter and power shift transmission cylinders (1,F);
 a valve assembly housing (26) connected in the line including a selective cylinder supplying modulator valve (58) and load piston (164) therefor having an interacting loading spring (88) and individually reciprocal in a common housing bore (34) supplied by said line; and
 a leakage opening (209) in the branch (59) of supply to the torque converter, included in said bore and having an opening-open and an opening-closed condition controlling leakage of converter fluid supply diverted through said bore (34);
 said load piston (164) reciprocal to open the leakage opening when unloading the modulator valve while the latter is not supplying said cylinder branch to operate a selected cylinder (F) during a shift, and reciprocal to close the leakage opening at but after said piston (164) has fully loaded the valve under full drive engagement pressure so as to operate the selected cylinder (F) and execute the shift of the transmission (10).

14. The method of operating substantially shock-free an hydraulic torque converter transmission providing a converter driven gear drive through plural power paths, mutually exclusively, by selectable power shift transmission cylinders (F) operated by pressure fluid circulated thereto, said converter providing full converter drive capacity under substantially increased converter flow over that fluid flow afforded, during a shift, to circulate to the converter allowing appreciable converter slip,
 said method comprising the steps of:
 preparing the power path (F) through the transmission (10) by adding to the cylinder fluid circulating to the selected power shift transmission cylinder sufficient cylinder fluid to raise pressure therein to substantially full engagement pressure for setting the transmission in the gear drive (F) desired; and thereupon automatically completing the power path by adding to converter fluid, circulating to the converter (14), sufficient converter fluid to raise flow in the converter to substantially full converter automatically capacity flow for completing the drive through the transmission (10).

15. Control system for operating substantially shock-free an hydraulic torque converter transmission providing a converter driven gear drive through plural power paths, mutually exclusively, by selectable power shift transmission cylinders (R, F, 1) operated by pressure fluid circulated from a line (24, 32) common thereto, said converter (14) providing full converter drive capacity under substantially increased converter flow over that fluid flow afforded, during a shift, to circulate in a converter line to the converter allowing appreciable converter slip,
 said control system comprising:
 means (164, 58, F) connected to said common line to prepare the power path through the transmission (10) by adding to the cylinder (F) fluid circulating to the selected power shift transmission cylinder (F) sufficient cylinder fluid to raise pressure therein to substantially full engagement pressure for setting the transmission in the gear drive desired; and
 means (164, 209, 59, 70) connected to said converter line (63) to thereupon automatically complete the power path by adding to converter fluid, circulating to the converter, sufficient converter fluid to raise flow in the converter to substantially full converter capacity flow for completing the drive through the transmission (10).

16. Control system for operating substantially shock-free an hydraulic torque converter transmission providing a gear drive through plural power paths, mutually exclusively, by selectable power shift transmission cylinders operated by pressure fluid circulated from a line (24, 32) common thereto, each cylinder (R, F, 1) providing full engagement drive capacity under substantially increased cylinder pressure over that fluid pressure afforded, during a shift, to the selected cylinder for low pressure filling of same,
 said control system comprising:
 1st means (164, 58, F) connected to the common line to establish the power path through the transmission (10) by adding to the cylinder fluid, circulating to the selected power shift transmission cylinder, sufficient cylinder fluid to raise pressure therein to substantially full engagement pressure for setting the transmission in the gear drive (F) desired;
 means forming a common valve bore (34);
 a load piston element (164) in the common bore controlling a modulating element (58) included in the 1st means and disposed in the common bore;
 a control element (174) in the common bore operative to control said load piston element (164) to cause the modulating element (58) to reduce the cylinder pressure to that fluid pressure which is afforded, during a shift, to the selected cylinder (F) for low pressure filling of same, said control element (174) having a reverse operation; and
 a simulated clutch piston element (194) in the common bore establishing therein cooperation with the control element (174) to temporarily delay the latter from its reverse operation.

17. Control system for operating substantially shock-free an hydraulic torque converter transmission providing a converter driven gear drive through plural power paths, mutually exclusively, by selectable power shift transmission cylinders operated by pressure fluid circulated from a line common thereto, each cylinder providing full engagement drive capacity under substantially increased cylinder pressure over that fluid pressure which is afforded, during a shift, to the cylinder for low pressure filling of same, said converter providing full converter drive capacity under substantially increased converter flow over that fluid flow which is afforded, during a shift, to circulate in a converter line to the converter allowing appreciable converter slip, said control system comprising:

1st means (164, 58, F) connected to said common line to prepare the power path through the transmission by adding to the cylinder fluid circulating to the selected power shift transmission cylinder sufficient cylinder fluid to raise pressure therein to substantially full engagement pressure for setting the transmission in the gear drive desired;

2nd means (164, 209, 59, 70) connected to said converter line (63) to thereupon automatically complete the power path by adding to converter fluid, circulating to the converter, sufficient converter fluid to raise flow in the converter to substantially full converter capacity flow for completing the drive through the transmission;

means forming a common valve bore (34);

said 2d means comprising a load element (164) in the common bore controlling a modulating element (58) included in the 1st means and disposed in the common bore;

a control element (174) in the common bore operative to control said load element (164) to cause the converter flow to reduce to that fluid flow which is afforded, during a shift, to circulate to the converter allowing appreciable converter slip and at the same time operative to control the load element (164) to cause the modulating element (58) to reduce the cylinder pressure to that fluid pressure which is afforded, during a shift, to the selected cylinder for low pressure filling of same, said control element (174) having a reverse operation; and e common bore controlling a modulating element (58) included in the 1st means and disposed in the common bore;

a simulated clutch element (194) in the common bore establishing cooperation with the control element (174) to temporarily delay the latter from its reverse operation.

* * * * *